United States Patent [19]

Marsland

[11] Patent Number: 5,923,878
[45] Date of Patent: Jul. 13, 1999

[54] SYSTEM, METHOD AND APPARATUS OF DIRECTLY EXECUTING AN ARCHITECTURE-INDEPENDENT BINARY PROGRAM

[75] Inventor: Timothy Marsland, Half Moon Bay, Calif.

[73] Assignee: Sun Microsystems, Inc., Palo Alto, CA

[21] Appl. No.: 08/748,933

[22] Filed: Nov. 13, 1996

[51] Int. Cl.[6] .................................................. G06F 9/45
[52] U.S. Cl. ...................... 395/704; 395/705; 395/706; 707/103
[58] Field of Search ................... 395/708, 700, 395/702, 704, 706, 707, 709; 380/4; 707/100, 103; 364/784

[56] References Cited

U.S. PATENT DOCUMENTS

| | | | |
|---|---|---|---|
| 5,335,344 | 8/1994 | Hastings | 395/183.11 |
| 5,367,685 | 11/1994 | Gosling | 395/707 |
| 5,381,547 | 1/1995 | Flug et al. | 395/685 |
| 5,590,331 | 12/1996 | Lewis et al. | 395/708 |
| 5,675,801 | 10/1997 | Lindsey | 395/702 |
| 5,761,513 | 6/1998 | Yellin et al. | 395/705 |
| 5,787,431 | 7/1998 | Shaughnessy | 707/100 |

OTHER PUBLICATIONS

Jason Steinhorn, "Compiling Java", Embedded Systems Programming, vol. 11, No. 10, pp. 42–56, Sep. 1998.

*Primary Examiner*—Tariq R. Hafiz
*Assistant Examiner*—Anil Khatri
*Attorney, Agent, or Firm*—Beyer & Weaver, LLP

[57] ABSTRACT

A system, method, and apparatus is disclosed for executing an architecture-independent binary program on a computer. An object file is read, and architecture-independent object code is extracted from the object file. Dynamic dependency information is also extracted from the object file. The dependency information is provided to an interpreter, which is invoked to execute the object code. The object file is preferably in an architecture-neutral format, preferably the ELF format defined as the standard binary interface that is used by application programs on operating systems that comply with the UNIX System V Interface Definition.

21 Claims, 11 Drawing Sheets

201

210

/**
 * The HelloWorldApp class implements and application that
 * simply displays "Hello World!" to the standard output.
 */

220 class HelloWorldApp {
    public static void main (String[ ] args) {
        System.out.println ("Hello World!");
230
        // Display the string.
240
    }
}

FIG. 2

```
#! /bin/ksh

_D=$ (cd `/usr/bin/dirname $0` && print -n $PWD
function_
{
    [ [ $1 = ${1##/} ] ] && print -n ${_D}/
    print -n $1
} export JAVA_HOME=${JAVA_HOME:-/usr/java}
export CLASSPATH=$ (/opt/acme/lib:_ lib)
exec ${JAVA_HOME}/bin/java progname "$@"
```

- 801 (arrow)
- 810 { (lines above)
- 820 } 
- 830 export JAVA_HOME line
- 840 exec line

FIG. 8

SYSTEM, METHOD AND APPARATUS OF DIRECTLY EXECUTING AN ARCHITECTURE-INDEPENDENT BINARY PROGRAM

BACKGROUND

1. Technical Field

This invention relates to a system, method and apparatus for direct execution of an architecture-independent binary program directly on a computer. More particularly, the invention relates to a system, method and apparatus permitting a user to invoke an architecture-independent binary program without identifying an interpreter program used to interpret the architecture-independent program and without specifying any libraries needed to resolve run-time program calls.

2. Background of the Invention

Generally, computer programs are stored in one of two forms. In one form, the program is stored as a text file (source code) consisting of of human-readable statements using an encoding of letters, digits and other printable characters in a character code such as American Standard Code for Information Interchange (ASCII) or Extended Binary Coded Decimal Interchange Code (EBCDIC). Such programs are not directly executable by a computer, and in order to be executed, must be interpreted by a special purpose program, called an interpreter, written to understand the language in which the program is written. A typical example is a program written in Beginner's All-purpose Symbolic Instuction Code (BASIC). BASIC programs are typically presented to an interpreter in source form, and interpreted line-by-line.

In another form, a source code file is processed by a compiler to produce an object file. The object file includes a sequence of binary data (object code) that are meaningful only to a specific computer architecture, in that the data represents a sequence of instructions for that particular architecture. The object file may be loaded into the computer's storage and the instructions directly executed by the computer by instructing the computer to fetch and execute the instructions from the location at which the program is loaded, without the need for an interpreter. Alternatively, the object file may be used by a linker as input to create a file that includes executable program code from several such object files. Using the BASIC example, a BASIC source file may be compiled to produce an object file that is directly executable on a target computer.

A disadvantage to this approach is that such a program is not portable. Because the binary code is machine-specific, the program cannot be easily ported to a computer system of a different architecture. This makes the use of purely binary programs unattractive in a heterogeneous environment.

One approach has been to provide computer programs in a human-readable text format, rather than in binary format. An interpreter is invoked to read the text program (often called a "script" to distinguish it from a binary program) and to interpret the statements in the program, executing them one at a time. This is effectively the first approach of using an interpreted BASIC program. A disadvantage to this approach is that there is significant overhead in interpreting the text statements. For example, the interpreter must devote significant computing resources to lexical scanning and validation of each statement, to assure that it represents a syntactically correct and executable operation. This resource intensity makes the use of scripts unattractive.

Sun™ Microsystems has produced a solution known as Java.™ Java™ is designed to meet the challenges of application development in the context of heterogeneous, network-wide distributed environments. The challenges include the secure delivery of applications that consume the minimum of system resources, can run on any hardware and software platform, and can be extended dynamically. The requirement to operate on multiple platforms in heterogeneous networks invalidates the traditional schemes of binary distribution, release, upgrade, patch, and so on. Instead, the Java™ system provides an architecture-neutral, portable, and dynamically adaptable quasi-machine code binary format.

A remaining difficulty with this format, however, is that the user is required to know whether a program he or she desires to run is written in Java™ or is encoded as a native binary program appropriate for his computing platform. If encoded in the native format, the program is directly executable. If encoded as a Java™ class file, the user must invoke the Java™ interpreter to interpret the bytecodes in the file.

It is therefore desirable to provide a method of encoding a Java™ class file in a format that is consistent with the computing platform on which the program is to be executed. It is further desirable to encode the file in a format that is an industry standard and that is amenable to implementation on a wide variety of computing platforms, thereby ensuring that the file remains portable across such platforms. It is further desirable to provide support in the format for identifying the locations of program files external to the executed file, in order to allow the dynamic resolution of those external files at runtime.

SUMMARY OF THE INVENTION

A system, method, and apparatus is disclosed for executing an architecture-independent binary program on a computer. An object file is read, and object code is extracted from the object file. A field in the object code is interrogated to determine whether the object code is architecture-independent object code that requires interpretation. If so, an interpreter is called to interpret the architecture-independent object code. Dynamic dependency information may also be extracted from the object file and provided to the interpreter. The object file is preferably in an architecture-neutral format, preferably the ELF format defined as the standard binary interface that is used by application programs on operating systems that comply with the UNIX System V Interface Definition.

Additional features of the invention will become apparent upon examination of the description that follows, particularly with reference to the accompanying drawings.

DESCRIPTION OF THE DRAWINGS

The foregoing and other objects, aspects and advantages are better understood from the following detailed description of a preferred embodiment of the invention with reference to the drawings, in which:

FIG. 2 depicts a sample program written in Java;

FIG. 8 depicts an example of a script file produced by the program of FIG. 7.

DETAILED DESCRIPTION

Figure 1:
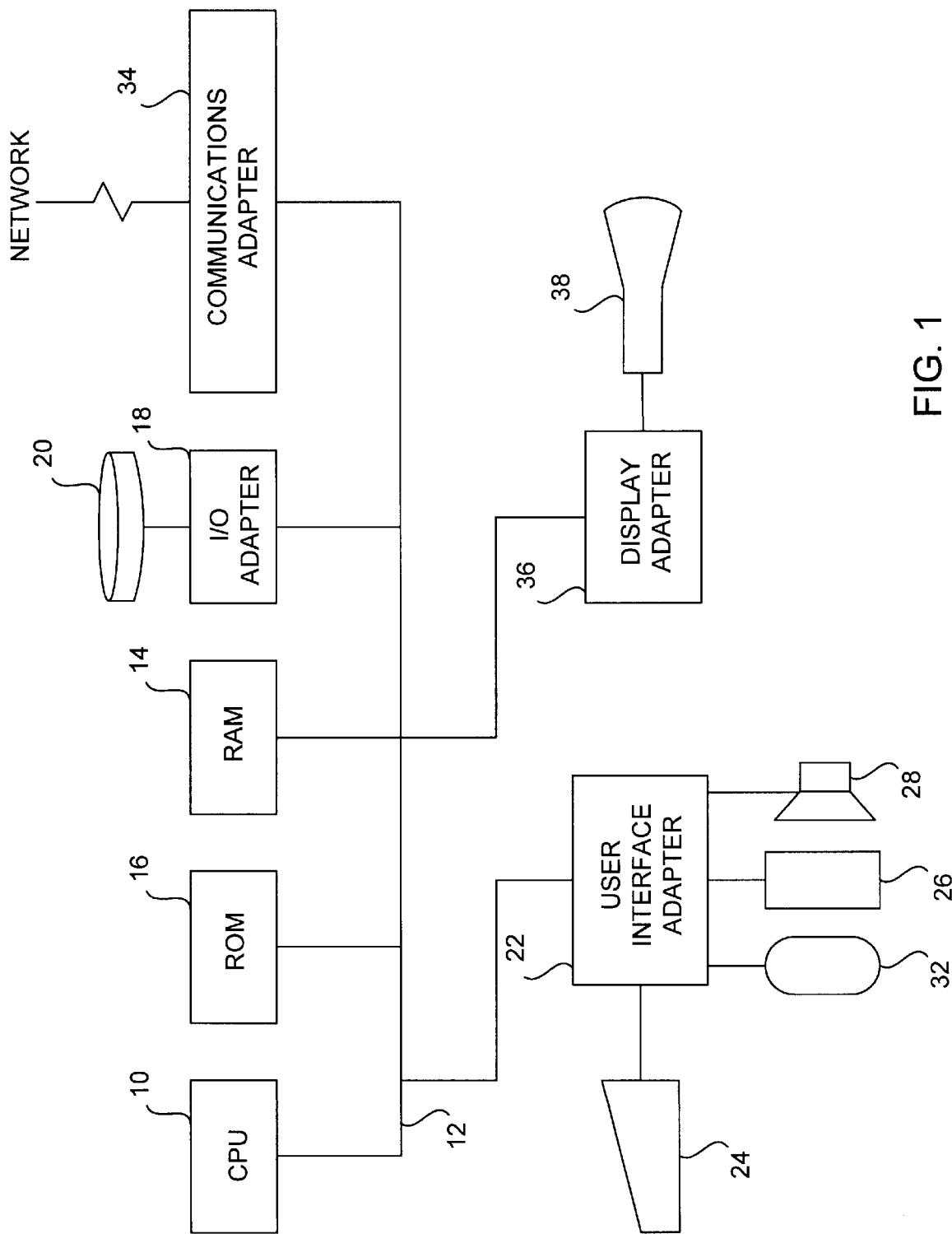
FIG. 1 is a block diagram of a representative hardware environment in accordance with a preferred embodiment.

A preferred embodiment of a system in accordance with the present invention is preferably practiced in the context of a computer such as Sun™ Sparcstation™, a UNIX-based workstation, or a personal computer such as IBM PS/2, Apple Macintosh computer. A representative hardware environment is depicted in FIG. 1, which illustrates a typical hardware configuration of a workstation in accordance with a preferred embodiment having a central processing unit 10, such as a microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk storage units 20 to the bus 12, a user interface adapter 22 for connecting a keyboard 24, a mouse 26, a speaker 28, a microphone 32, and/or other user interface devices such as a touch screen (not shown) to the bus 12, communication adapter 34 for connecting the workstation to a communication network (e.g., a data processing network) and a display adapter 36 for connecting the bus 12 to a display device 38. The workstation typically has resident thereon an operating system such as Sun™ Microsystems' Solaris™ or another UNIX-based operating system, or another operating system such as the Microsoft Windows Operating System (OS), the IBM OS/2 operating system, or the Apple Computer MACOS. Those skilled in the art will appreciate that the present invention may also be implemented on platforms and operating systems other than those mentioned.

The Java™ computing language and environment is designed to support applications that will be deployed into heterogeneous networked environments. In such environments, applications must be capable of executing on a variety of hardware architectures. Within this variety of hardware platforms, applications must execute atop a variety of operating systems and interoperate with multiple programming language interfaces. To accommodate the diversity of operating environments, the Java™ compiler generates class files comprising bytecodes, an architecture neutral intermediate format designed to transport code efficiently to multiple hardware and software platforms. The interpreted nature of Java™ solves both the binary distribution problem and the version problem; the same Java™ language byte codes will run on any platform.

Java™ provides strict data type definitions in its specification of the basic language. The Java™ specification specifies the sizes of its basic data types and the behavior of its arithmetic operators. As a result, programs are the same on every platform—there are no data type incompatibilities across hardware and software architectures.

The architecture-neutral and portable language environment of Java™ is known as the Java™ Virtual Machine. The Java™ Virtual Machine is the specification of an abstract machine for which Java™ language compilers can generate code. Specific implementations of the Java™ Virtual Machine for specific hardware and software platforms then provide the concrete realization of the virtual machine. The Java™ Virtual Machine is based primarily on the POSIX interface specification—an industry-standard definition of a portable system interface. Implementing the Java™ Virtual Machine on new architectures is a relatively straightforward task as long as the target platform meets basic requirements such as support for multithreading.

FIG. 2 depicts a sample program 201 written in Java™. The program begins with a sequence of lines that constitute a comment 210. A comment is a statement that performs no function and that is ignored by a compiler processing the file; its purpose is to provide human-readable documentation regarding the program.

The next two lines constitute a class statement 220. The class statement provides information regarding the attributes of a program component, called a class. These attributes include the class name (here, "HelloWorldApp"), its storage attributes (here, public, static, void and main) and the name, number and type of parameters accepted by the class (here a single parameter named "args" of datatype "String[ ]").

The next line 230 shows an invocation of an external program. Here, Java™ program 201 is invoking another program (called a "method"), named "System.out.println" and passing it to it the string "Hello, World!" System.out-.println is a method whose function is to display a line of text passed to it. When the HelloWorldApp class is executed, the text "Hello, World!" will be displayed on the user's screen.

The last line 240 is an alternative form of a comment statement. The example presented here is for illustrative purposes only. The Java™ language is described in full in Gosling, Joy & Steele, *The Java™ Language Specification* (1996), the disclosure of which is hereby incorporated by reference.

Figure 3:
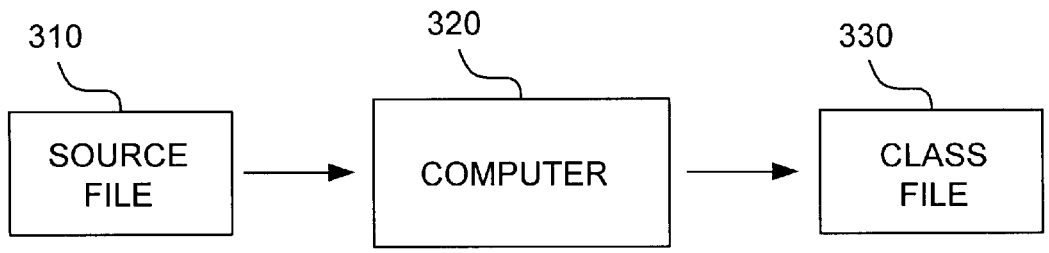
FIG. 3 depicts the Java™ compilation process.

FIG. 3 depicts the Java™ compilation process. This compilation typically results when the user types the name of the Java™ compiler (typically, "javac") followed by the name of the class to be compiled (e.g. "javac HelloWorldApp"). A source file 310 containing Java™ source code such as Java™ program 201 is provided to the Java™ compiler 320. The Java™ compiler 320 analyses the source code and produces class file 330. The Java™ compiler does not generate "machine code" in the sense of native hardware instructions. Instead it generates a sequence of bytecodes: a high-level, machine-independent code for a hypothetical machine that is implemented by the Java™ interpreter and run-time system. One of the early examples of the bytecode approach was the UCSD P-System, which was ported to a variety of eight-bit architectures in the middle 1970s and early 1980s and enjoyed widespread popularity during that period. In the present day, current architectures have the power to support the bytecode approach for distributed software. Java™ bytecodes are designed to be easy to interpret on any machine, or to dynamically translate into native machine code if required by performance demands.

The Java™ CLASS Format

Figure 4:
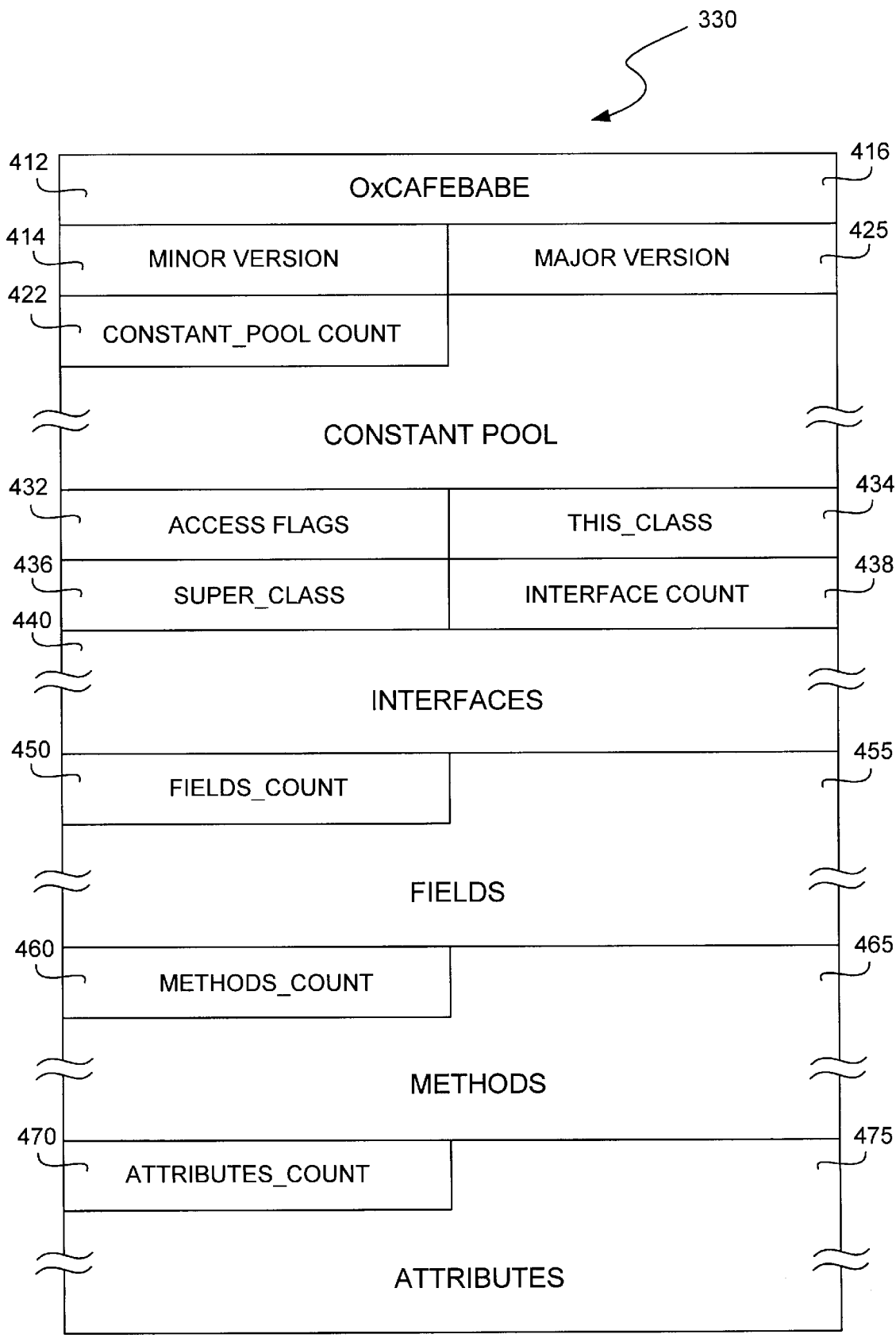
FIG. 4 depicts the format of a Java™ class file.

FIG. 4 depicts the format of a class file 330, which is encoded in the Java™ CLASS format. The Java™ CLASS format is a highly structured format, and is described in Sun™ Microsystems' *Java™ Virtual Machine Specification, Release* 1.0 *Beta DRAFT* (Aug. 21, 1995), the disclosure of which is hereby incorporated by reference.

Each class file contains the compiled version of either a Java™ class or a Java™ interface. An interpreter or "virtual machine" designed to execute a Java™ program supports all class files that conform to this format.

A Java™ class file comprises a stream of 8-bit bytes. All 16-bit and 32-bit quantities are constructed by reading in two or four 8-bit bytes, respectively. The bytes are joined together in network (big-endian) order, where the high bytes come first. This format is supported by the Java™ java.io.DataInput and java.io.DataOutput interfaces, and classes such as java.io.DataInputStream and java.io.DataOutputStream.

The class file format is described here using a structure notation. Successive fields in the structure appear in the external representation without padding or alignment. Variable size arrays, often of variable sized elements are called tables and are commonplace in these structures. The types u1, u2, and u4 mean an unsigned one-, two-, or four-byte quantity, respectively, which are read by method such as readUnsignedByte, readUnsignedShort and readInt of the java.io.DataInputinterface.

Class file 330 is structured as follows:

```
ClassFile {
    u4  magic;
    u2  minor_version;
    u2  major_version;
    u2  constant_pool_count;
    cp_info constant_pool[constant_pool_count- 1];
    u2  access_flags;
    u2  this_class;
    u2  super_class;
    u2  interfaces_count;
    u2  interfaces[interfaces_count];
    u2  fields_count;
    field_info fields[fields_count];
    u2 methods_count;
    method_info methods [methods_count];
    u2 attributes_count;
    attribute_info attributes[attribute_count];
}
``` magic

The "magic" field 412 is four bytes in length and is used to identify the file as a Java™ class-format file. The magic field has the value 0xCAFEBABE.

minor_version and major_version

The minor_version field 414 and major_version field 416 contain the version number of the Java™ compiler that produced this class file. The combination of the two fields may be interrogated by a virtual machine to determine whether it is capable of executing the compiled class. An implementation of the virtual machine will normally support some range of minor version numbers 0–n of a particular major version number. If the minor version number is incremented, the new code won't run on the old virtual machines, but it is possible to make a new virtual machine which can run versions up to version number n+1. A change of the major version number indicates a major incompatible change, one that requires a different virtual machine that may not support the old major version in any way.

constant_pool_count

The constant_pool_countfield 422 indicates the number of entries in the constant pool 425 in the class file.

constant_pool

The constant pool 425 is a table of values. The values in the constant pool 425 comprise various string constants, classnames, field names, and others that are referred to by the class structure or by the executable code in the class. The first constant pool entry, denoted as constant_pool[0], is always unused by the compiler, and may be used by an implementation for any purpose.

Each of the constant_pool entries 1 through constant_pool_count-1 is a variable-length entry, whose format is indicated by the first "tag" byte, according to the following table:

| Value | Constant Type | Meaning |
|---|---|---|
| 1 | CONSTANT_Utf8 | utf-8 format string |
| 2 | CONSTANT_Unicode | unicode format string |
| 3 | CONSTANT_Integer | integer |
| 4 | CONSTANT_Float | floating point |
| 5 | CONSTANT_Long | long integer |
| 6 | CONSTANT_Double | double floating point |
| 7 | CONSTANT_Class | class |
| 8 | CONSTANT_String | string |
| 9 | CONSTANT_Fieldref | field reference |
| 10 | CONSTANT_Methodref | method reference |
| 11 | CONSTANT_InterfaceMethodref | interface method reference |
| 12 | CONSTANT_NameAndType | name and type |

A utf-8 format string constant pool entry represents a constant character string value. Utf-8 strings are encoded so that strings containing only non-null ASCII characters, can be represented using only one byte per character, but characters of up to 16 bits can still be represented.

All characters in the range 0x0001 to 0x007F are represented by a single byte, in which bit 0 is set to binary '0' and in which bits 1–7 represent the ASCII code 0x0001 to 0x007F, respectively. The null character 0x0000 and characters in the range 0x0080 to 0x07FF are represented by a pair of two bytes, or 16 bits, denoted here as bits 0–15. Bits 0–2 are set to binary '110' and bits 8–9 are set to binary '10'. The remaining eleven bits 3–7 and 10–15 correspond respectively to the low-order eleven bits in the character to be encoded.

Characters in the range 0x0800 to 0xFFFF are represented by three bytes, or 24 bits, denoted here as bits 0–23. Bits 0–3, 8–9 and 16–17 are set to binary values '1110', '10', and '10', respectively. The remaining 8 bits 4–7, 10–15 and 18–23 correspond to the 8 bits in the character to be encoded.

The null character 0x00 is encoded in two-byte format rather than one-byte, with the result that encoded strings never have embedded nulls. Only one-byte, two-byte, and three-byte formats are used; longer utf-8 formats are unrecognized.

A utf-8 string is structured as follows:

```
CONSTANT_Utf8_info{
    u1 tag;
    u2 length;
    u1 bytes[length];
}
```

The tag field has the constant value 0x0001 indicating a utf-8 encoded string. The length field is a two-byte field indicating the length of the string. The bytes field is the encoded string.

A unicode string constant pool entry represents a constant unencoded character string value. A unicode string is structured as follows:

```
CONSTANT_Unicode_info{
    u1 tag;
    u2 length;
    u1 bytes[length];
}
```

The tag field has the constant value 0x0002 indicating a unicode-format string. The length field is a two-byte field indicating the length of the string. The bytes field is the string value.

An integer constant pool entry represents a four-byte integer. The constant pool entry is structured as follows:

```
CONSTANT_Integer_info{
    u1 tag;
    u4 bytes;
}
```

The tag field has the constant value 0x0003 indicating a integer. The bytes field is the integer value.

A float constant pool entry represents a four-byte floating-point number. The constant pool entry is structured as follows:

```
CONSTANT_Float_info{
    u1 tag;
    u4 bytes;
}
```

The tag field has the constant value 0x0004 indicating a floating-point number. The bytes field is the floating-point value.

An long integer constant pool entry represents an eight-byte integer. The constant pool entry is structured as follows:

```
CONSTANT_Long_info{
    u1 tag;
    u4 high_bytes;
    u4 low_bytes;
}
```

The tag field has the constant value 0x0005 indicating a long integer. The high_bytes and low_bytes fields together make up the integer value. A long integer constant pool entry takes up two spots in the constant pool 425. If this is the nth entry in the constant pool 425, then the next entry will be numbered n+2.

A double float constant pool entry represents an eight-byte floating-point number. The constant pool entry is structured as follows:

```
CONSTANT_Double_info{
    u1 tag;
    u4 high_bytes;
    u4 low_bytes;
}
```

The tag field has the constant value 0x0006 indicating a double floating-point number. The high_bytes and low_bytes fields together make up the floating-point value. A double float constant pool entry takes up two spots in the constant pool 425. If this is the nth entry in the constant pool 425, then the next entry will be numbered n+2.

A class constant pool entry represents a Java™ class or a interface. The constant pool entry is structured as follows:

```
CONSTANT_Class_info{
    u1 tag;
    u2 name_index;
}
```

The tag field has the constant value 0x0007 indicating a class. The name_index field is a subscript into the constant pool 425, to a utf-8 format string constant that gives the string name of the class.

A string constant pool entry represents Java™ objects of the built-in Java™ type "String." The constant pool entry is structured as follows:

```
CONSTANT_String_info{
    u1 tag;
    u2 string_index;
}
```

The tag field has the constant value 0x0008 indicating a string. The string_index field is a subscript into the constant pool 425, to a utf-8 format string constant that gives the value to which the String-type object is initialized.

A field constant pool entry, method reference constant pool entry, and interface method reference constant pool entry represent references to Java™ fields, methods, and interface methods, respectively. The constant pool entries are structured as follows:

```
CONSTANT_Fieldref_info{
    u1 tag;
    u2 class_index;
    u2 name_and_type_index;
}
CONSTANT_Methodref_info{
    u1 tag;
    u2 class_index;
    u2 name_and_type_index;
}
CONSTANT_InterfaceMethodref_info{
    u1 tag;
    u2 class_index;
    u2 name_and_type_index;
}
```

The tag field has the constant value 0x0009, 0x000A, or 0x000B, indicating a field reference, method reference, or interface method reference, respectively. The class_index field is a subscript into the constant pool 425, to a class constant that is used to identify the name of the class or interface containing the field or method. The name_and_type_index field is a subscript into the constant pool 425, to a NameAndType constant that is used to identify the name and signature of the field or method.

A NameAndType constant pool entry represents a field or method without indicating the class to which the name or field, as the case may be, belongs. The constant pool entry is structured as follows:

```
CONSTANT_NameAndType_info{
    u1 tag;
    u2 name_index;
    u2 signature_index;
}
```

The tag field has the constant value 0x000C indicating a NameAndType entry. The name_index field is a subscript into the constant pool 425, to a utf-8 format string constant that gives the name of the field or method. The signature_index field is a subscript into the constant pool 425, to a utf-8 format string constant that gives a signature of the field or method. The signature, in this context, refers to a string that represents a type of a method, field or array. The field signature represents the value of an argument to a function or the value of a variable. A return-type signature represents the return value from a method. An argument signature represents an argument passed to a method. A method signature comprises one or more arguments signatures and a return signature, thereby representing the arguments expected by a method, and the value that it returns.

The structure and self-referential nature of the cell pool thereby provides great flexibility in implementation of data encoded in an class file.

access_flags

The access_flags field 432 contains a mask of up to sixteen modifiers used with class, method, and field declarations. The same encoding is used on similar fields in field_info and method_info as described below. The access_flags field is encoded as follows:

| Flag Name | Value | Meaning | Used By |
|---|---|---|---|
| ACC_PUBLIC | 0x0001 | Visible to everyone | Class, Method, Variable |
| ACC_PRIVATE | 0x0002 | Visible only to the defining class | Method, Variable |
| ACC_PROTECTED | 0x0004 | Visible to subclasses | Method, Variable |
| ACC_STATIC | 0x0008 | Variable or method is static | Method, Variable |
| ACC_FINAL | 0x0010 | No further subclassing, overriding, or assignment after initialization | Class, Method, Variable |
| ACC_SYNCHRONIZED | 0x0020 | Wrap use in monitor lock | Method |
| ACC_VOLATILE | 0x0040 | Can't cache | Variable |
| ACC_TRANSIENT | 0x0080 | Not to be written or read by a persistent object manager | Variable |
| ACC_NATIVE | 0x0100 | Implemented in a language other than Java ™ | Method |
| ACC_INTERFACE | 0x0200 | Is an interface | Class |
| ACC_ABSTRACT | 0x0400 | No body provided | Class, Method | this_class

The this_class field 434 is an index into the constant pool 425; constant_pool[this_class]must be of type CONSTANT_class.

super_class

The super_class 436 field is an index into the constant pool 425. If the value of super_class field 436 is nonzero, then constant_pool[super-class] must be a class, and gives the index of this class's superclass (that is, the class from which the present class is derived) in the constant pool 425. If the value of super_class field 436 is zero, then the class being defined must be java.lang.Object, and it has no superclass.

interfaces_count

The interfaces_count field 438 gives the number of interfaces that this class implements.

interfaces table

Each value in interfaces table 440 is an index into the constant pool 425. If a table value is nonzero (interfaces[i] !=0, where 0<=i<interfaces_count), then constant_pool [interfaces[i]]must be an interface that this class implements.

fields_count

The fields_count field 450 gives the number of instance variables, both static and dynamic, defined by the this class field. The fields table 455 includes only those variables that are defined explicitly by this class. It does not include those instance variables that are accessible from this class but are inherited from superclasses.

fields table

Each value in the fields table 450 is a more complete description of a field in the class. Each field is described by a variable length field_info structure. The format of this structure is as follows:

```
field_info{
    u2 access_flags;
    u2 name_index;
    u2 signature_index;
    u2 attributes_count;
    attribute_info attributes[attribute_count];
}
```

The access_flags field is a set of sixteen flags used by classes, methods, and fields to describe various properties and how they many be accessed by methods in other classes. This field has the same names, values and meanings as the access_flags field 432 previously disclosed.

The possible flags that can be set for a field are ACC_PUBLIC, ACC_PRIVATE, ACC_PROTECTED, ACC_STATIC, ACC_FINAL, ACC_VOLATILE, and ACC_TRANSIENT. At most one of ACC_PUBLIC, ACC_PROTECTED, and ACC_PRIVATE can be set for any method.

The name_index field is a subscript used to index into the constant pool 425 indicating a CONSTANT_Utf8 string, which is the name of the field.

The signature_index field is a subscript that is used to index into the constant pool 425 to indicate a CONSTANT_Utf8 string, which is the signature of the field.

The attributes_count field indicates the number of additional attributes about this field.

The attributes field represents the attributes of a particular field represented by the field_info structure. A field can have any number of optional attributes associated with it. For example, the "ConstantValue" attribute, which indicates that this field is a static numeric constant, indicates the constant value of that field.

methods_count

The methods_count field 460 indicates the number of methods, both static and dynamic, defined by this class. This table only includes those methods that are explicitly defined by this class. It does not include inherited methods.

methods table

Each value in the methods table 465 is a more complete description of a method in the class. Each method is described by a variable length method_info structure. The format of this structure is as follows:

```
method_info{
    u2 access_flags;
    u2 name_index;
    u2 signature_index;
    u2 attributes_count;
    attribute_info attributes[attribute_count];
}
```

The access_flags field is a set of sixteen flags used by classes, methods, and fields to describe various properties and how they many be accessed by methods in other classes. This field has the same names, values and meanings as the access_flags field 432 previously disclosed. The possible fields that can be set for a method are ACC_PUBLIC, ACC_PRIVATE, ACC_PROTECTED, ACC_STATIC, ACC_FINAL, ACC_SYNCHRONIZED, ACC_NATIVE, and ACC_ABSTRACT. At most one of ACC_PUBLIC, ACC_PROTECTED, and ACC_PRIVATE can be set for any method.

The name_index field is a subscript used to index into the constant pool 425 indicating a CONSTANT_Utf8 string, which is the name of the method.

The signature_index field is a subscript that is used to index into the constant pool 425 to indicate a CONSTANT_Utf8 string, which is the signature of the method.

The attributes_count field indicates the number of additional attributes about this method.

The attributes field represents the attributes of a particular method represented by the method_info structure. A method can have any number of optional attributes associated with it. Each attribute has a name, and other additional information. For example, the "Code" attribute (see below) describe the bytecodes that are executed to perform this method, and the "Exceptions" attribute describes the Java™ Exceptions that are declared to result from the execution of the method.
attributes_count The attributes_count field 470 indicates the number of additional attributes about this class.
attributes The attributes table 475 defines the attributes associated with the class. A class can have any number of optional attributes associated with it. For example, the "SourceFile" attribute indicates the name of the source file from which this class file was compiled.

The Code attribute

The Code attribute has the following format:

```
Code_attribute{
    u2 attribute_name_index;
    u4 attribute_length;
    u2 max_stack;
    u2 max_locals;
    u4 code_length;
    u1 code[code_length];
    u2 exception_table_length;
    {   u2 start_pc;
        u2 end_pc;
        u2 handler_pc;
        u2 catch_type;
    }   exception_table [exception_table_length];
    u2 attributes_count;
    attribute_info attributes[attribute_count];
}
```

The attribute_name_index field is a subscript used to index into the constant pool 425 indicating a CONSTANT_Utf8 string containing "Code".

The attribute_length field indicates the total length of the "Code" attribute, excluding the initial six bytes.

The max_stack field defines the maximum number of entries on the operand stack that will be used during execution of this method.

The max_locals field defines the number of local variable slots used by this method.

The code_length field defines the number of bytes in the virtual machine code for this method.

The code field contains the actual bytes of the virtual machine code that implement the method.

The exception_table_length field defines the number of entries in the following exception table exception_table. This table is used by compilers which indicate which Exceptions a method is declared to throw. Each entry in the exception table describes one exception handler in the code. The two fields start_pc and end_pc indicate the ranges in the code at which the exception handler is active. The values of both fields are offsets from the start of the code. The start_pc field is inclusive, and the end_pc field is exclusive. The handler_pc field indicates the starting address of the exception handler. The value of the field is an offset from the start of the code.

If the catch_type field is nonzero, then constant_pool [catch_type] will be the class of exceptions that this exception handler is designated to catch. This exception handler should only be called if the thrown exception is an instance of the given class. If catch_type is zero, this exception handler should be called for all exceptions.

The attributes_count field indicates the number of additional attributes about code. The Code attribute can itself have attributes, which are designated using the attributes [attribute_count]fields. A Code attribute can have any number of optional attributes associated with it. Each attribute has a name, and other additional information. Currently, the only code attributes defined are the "LineNumberTable" and "LocalVariableTable," both of which contain debugging information.

The bytecodes represent a series of machine-independent instructions (i.e., object code) designed to be executed in a hypothetical 8-bit stack-based environment. Operations of the Java™ Virtual Machine most often take their operands from the stack and put their results back on the stack.

For example, the instruction "iload vindex" is represented by two 8-bit bytes. The first byte, having a value of 0×15 (decimal 21) indicates the iload instruction. The second byte provides an index into the current Java™ frame of a local variable whose value is to be pushed onto the operand stack.

For example, a bytecode sequence to execute the example HelloWorldApp class may consist of the nine-byte string 0×B200081201B60007B1. This sequence is interpreted as follows:

| B2 | 0008 | getstatic 0008; |
|----|------|-----------------|
| 12 |      | fconst_1;       |
| 01 |      | aconst_null;    |
| B6 | 0007 | invokevirtual 0007; |
| B1 |      | return;         |

The getstatic 0008 instruction uses the value 0008 to construct an index into the constant pool, which point to a field reference to a static field. In the present example, this may be used to indicate a parameter to be passed to another class, here the string having the value "Hello, World!". The fconst_1 instruction causes a single-precision floating point number "1" to be pushed onto the stack. The aconst_null instruction causes a null object reference to be pushed onto the stack. The fconst_1 and aconst_null instructions provide data that can be used to interpret the stacked parameters.

The invokevirtual 0007 instruction is used to invoke a virtual method that should be executed using the stacked parameters. The operand 0007 is used to construct an index into the constant pool. The item at that index of the constant pool contains a complete method signature for the method desired to be called. In the present example, this may be used to indicate a desired method to be called, here the method having the name "System.out.println".

The return instruction is used to terminate execution of the HelloWorldApp class.

Figure 5:
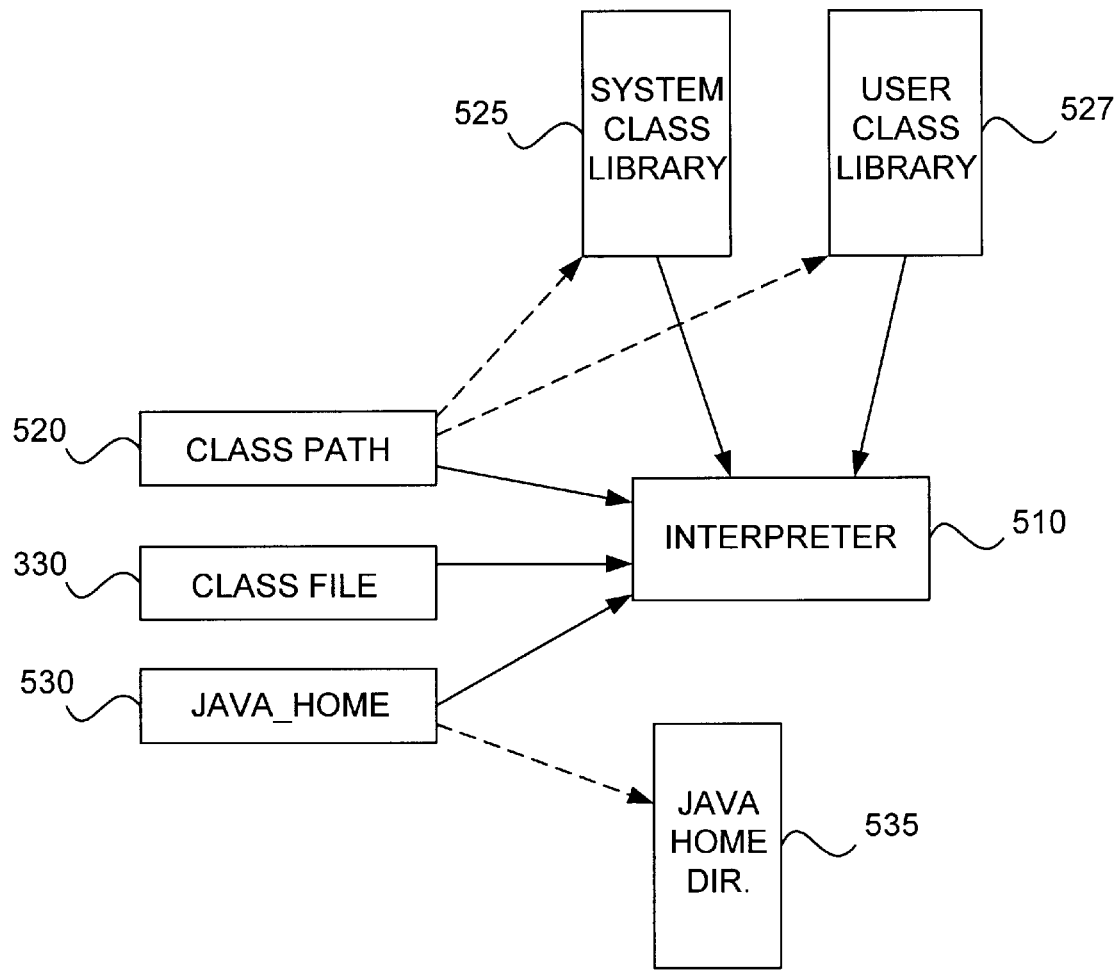
FIG. 5 depicts the execution of a compiled Java™ class.

FIG. 5 depicts the execution of a compiled Java™ class. This execution typically results when the user types the name of the Java™ interpreter (typically "java") followed by the name of the class to be executed (e.g. "java HelloWorldApp"). Interpreter 510 takes as input class file 330. The interpreter interrogates the environment variable 530 named "JAVA_HOME". The value of the JAVA_HOME environment variable is the name of the home directory 535 for the Java™ run-time system, which contains the Java™ interpreter and support programs, and will be used to load system routines used in the execution of the class. The "CLASSPATH" environment variable 520 contains the names of various user class libraries 527 and system class libraries 525 which contain additional classes that may be invoked at run time.

Figure 6:
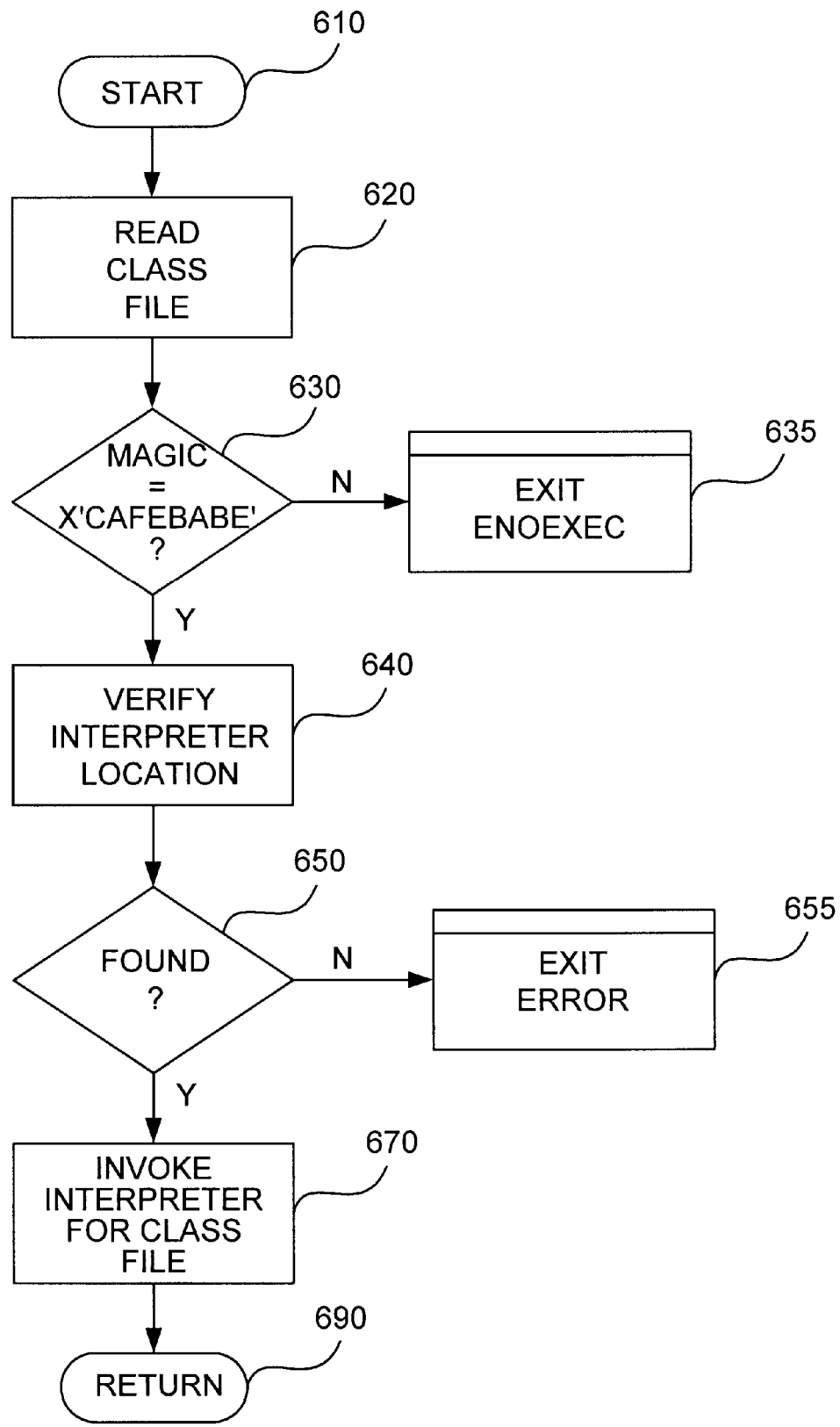
FIG. 6 depicts an extension to the standard system exec( ) processing extended to support compiled Java™ class files.

As noted, one of the disadvantages of the execution process depicted in FIG. 5 is that it requires the user to be aware that the program being executed is a Java™ class rather than a platform-native program file, and that the user must therefore explicitly invoke the Java™ interpreter. That is, the user must type "java HelloWorldApp" rather than simply "HelloWorldApp". FIG. 6 depicts an extension to the standard system exec( ) processing that is used to invoke platform-native program files, and extends that functionality to compiled Java™ class files. The extension in FIG. 6 is invoked when the user indicates the name of the compiled Java™ class file directly, without specifying that it must be interpreted (e.g., "HelloWorldApp" rather than "java HelloWorldApp").

Execution begins in step 610. In step 620, the extension reads the class file. In step 630, the extension checks the contents of magic field 412 to verify that it contains the predetermined value 0×CAFEBABE. If magic field 412 does not contain 0×CAFEBABE, the extension exits with an ENOEXEC return code in step 635. The ENOEXEC return code is a standard exec( ) return code indicating that the target is not executable. If the test is successful, control proceeds to step 640. In step 640, the extension obtains the location of the interpreter (e.g., "/usr/bin/java"). In step 650, the extension checks to see whether a file with the indicated name exists at the indicated location. If not, in step 655 the extension exits with an error condition. Otherwise, the extension invokes the named file in step 670, passing the name of the target class file to the interpreter for execution. Following the execution of the named class file by the interpreter, the extension exits at step 690.

Although the process depicted in FIG. 6 allows for direct implicit invocation of the Java™ interpreter without requiring the user to know that the file is a class file. However, it is not without its drawbacks. As shown in FIG. 5, the Java™ interpreter uses the CLASSPATH and JAVA_HOME environment variables to determine the libraries that are to be searched for routines and methods to be invoked at run time. In a complex system comprising many separate compiled class files, the user will be required to set the CLASSPATH variable to provide the Java™ interpreter with the location of the class files. Therefore, even under the approach depicted in FIG. 6, the use of Java™ is not transparent to the user, who needs to take additional steps to make his program execute correctly.

A second solution is to provide an automated means for producing a executable script that can be used to set the environment variables and invoke the Java™ interpreter using the named Java™ class file. Such a program is akin to a standard linker such as the program "ld". A Java™ pseudo-linker named, for example, "javald" is invoked as follows:

javald-C /opt/acme/lib-C lib -o foo progname

This syntax means that the program javald is invoked, which creates an output file named "foo" that, when invoked as the command "foo," causes the Java™ class file "progname.class" to be interpreted. The CLASSPATH environment variable should be set to include two libraries, named "/opt/acme/lib" and "lib". The reference /opt/acme/lib is an absolute reference, in that it is defined relative to the root directory "/". The root directory contains a directory named "opt", which in turn contains a directory named "acme", which in turn contains a directory named "lib", which is the specified directory. The reference "lib" is a relative reference, and refers to a directory named "lib" that is located relative to the directory containing the file foo.

Figure 7:
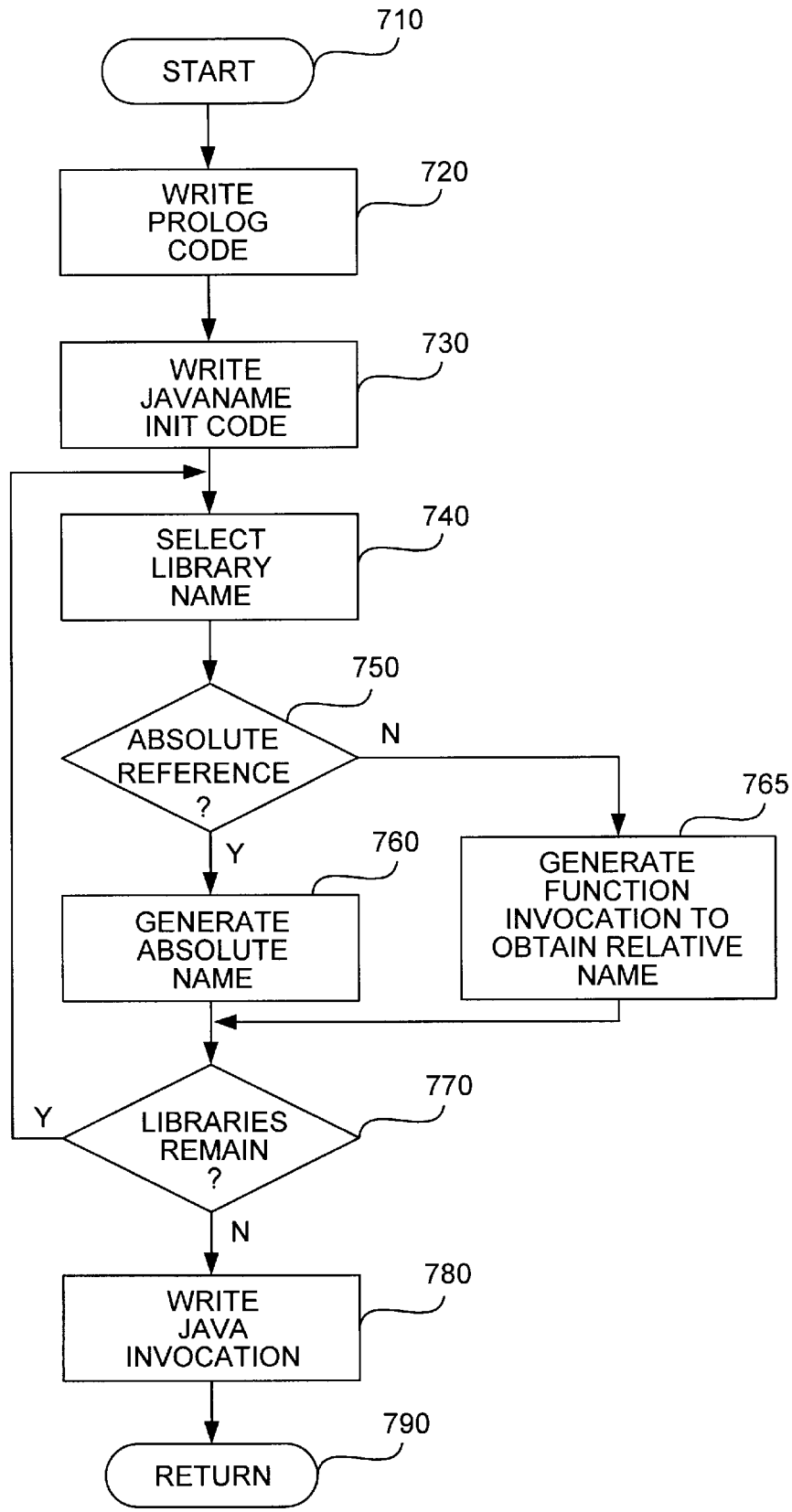
FIG. 7 depicts the steps of a program javald for creating a script file to set required environment variables and invoke the interpreter.

FIG. 7 depicts the steps of a program javald for creating a script file to set the required variables and invoke the interpreter. FIG. 7 is best understood with reference to FIG. 8, which depicts an example of a script file 801 produced by the program of FIG. 7. Execution begins in step 710. In step 720, the program writes a standard prolog code segment 810 containing code that will always need to be included. In step 730, javald writes a line of code to set the JAVA_HOME variable. In step 740, javald selects the first of the library names to be included in the CLASSPATH environment variable. These names were specified using the -C flag when javald was invoked. In step 750, javald determines whether the library name was specified as an absolute or relative reference. If absolute, step 760 generates an absolute reference. If relative, step 765 generates a function call that will determine the location of the specified library at runtime relative to the location of the executable shell script 801. In step 770, javald checks whether any libraries remain to be processed. If so, control returns to step 740; otherwise, control proceeds to step 780. In step 780, javald writes a line of code 830 that sets the CLASSPATH variable to a string containing the indicated library names, separated by colons, and a line of code 840 that will invoke the Java™ interpreter.

As mentioned above, FIG. 8 depicts a script file 801 to set the requisite environment variables and invoke the Java™ interpreter at run time. A line-by-line description follows.

The first line contains the string:

!/bin/ksh

A "#!" string, if present, is the use of a standard UNIX construct to provide the name of a script interpreter that will be used to execute the script. The file/bin/ksh is a standard name for the Korn shell program, a well-known script interpreter. Script 801 is written in the Korn shell language.

The next line contains the string:

_D=$(cd'/usr/bin/dirname $0'&& print -n $PWD)

This line causes the variable _D to be set to the fully-qualified pathname of the directory in which the script file resides. This works as follows. When the script begins execution, ksh sets the variable $0 to the name program executed in the command line, which will be the name of the script file either alone (e.g. "progname"), relative to the current directory (e.g., "bin/progname"), or as an absolute path (e.g., "/usr/bin/test/progname"). The shell executes the command line enclosed the reverse single quotes ("'", commonly called "backticks"),in this case "/usr/bin/dirname$0". The dirname command is a standard UNIX command that strips a non-directory suffix from a file name. For example, a "dirname progname" will produce as output ".", indicating the current directory. "dirname bin/progname" will produce "./bin", and "dirname/usr/bin/test/progname" will produce "/usr/bin/test". Because the backticked command follows the standard cd ("change directory") command, ksh will attempt to perform a cd command on the indicated directory. If successful, the command "print- n $PWD" following the "&&" is executed, which produces as output the fully-qualified pathname of the current directory $PWD, with the ordinary newline character suppressed. If the cd command is not successful, an error is returned. Thus, the result is either the fully qualified pathname of the directory in which the shell script exists, if such a directory exists, or an error condition, if it does not.

The Korn shell construct $( ) returns that value, which is placed in __D. This directory will be referred to as the "target directory".

The function definition "__" is not invoked until CLASS-PATH construction, which is described below.

The next line contains the string:

export JAVA__HOME=${JAVA__HOME:-/usr/java}

This is Korn shell syntax to set the JAVA__HOME environment variable to "/usr/java" if it is not already set. The use of the export command makes the variable available to subsequently spawned processes.

The next line contains the string:

export CLASSPATH=$(/opt/acme/lib:__lib)

This sets the CLASSPATH environment variable to a concatenation of the absolute reference /opt/acme/lib and a relative reference lib, separated by a colon. The use of the export command makes the variable available to subsequently spawned processes. The absolute reference /opt/acme/lib is expressed as a literal and requires no explanation. The second reference is an invocation of the "__" function. The "__" function is defined as follows:

```
function __
{
    [[$1 = ${1##/}]] && print -n ${__D}/
    print -n $1
}
```

The statement "function__" defines a function named "__" and enclosed by the brackets { }. The function operates on the value of the relative directory name passed to it, e.g. "lib", "../lib", etc. The expression [[$1=${1##/}]] evaluates whether the directory name begins with a leading slash character ("/"). If the directory name begins with a leading slash, the directory name is an absolute reference. If the directory name does not begin with a leading slash, the directory name is relative to, but not necessarily directly in, the target directory. For example, the reference "lib" refers to the directory "lib" in the target directory, but the reference "../lib", while relative to the target directory, refers to a directory in the parent directory of the target directory. If the directory reference is a relative reference, the "print -n ${__D}/" statement prepends the relative reference with an absolute reference to the target directory, and the resulting construct is appended with a slash. This has the effect of converting the relative reference to an absolute reference. The next line ("print -n $1") generates the specified directory reference.

For example, then, if the target directory is named "/usr/bin/test", this function will return the value "/usr/bin/test/lib" for an input parameter of "lib", and "/usr/bin/test/../lib" for an input parameter of "../lib". The result of this function is, therefore, a full pathname to the indicated relatively-referenced library, which will then be added to the CLASS-NAME string.

The final line is the Java™ interpreter invocation:

exec ${JAVA__HOME}/bin/javaprogname "$*"

This line invokes the Java™ interpreter named "java" found in the bin subdirectory of the Java™ home directory as specified by the JAVA__HOME environment variable. The interpreter is passed the name of the program (here, "progname") and any parameters that were passed to the script file. The $* variable is set by the Korn shell to a string of all the parameter values that were passed to the script.

Figure 9:
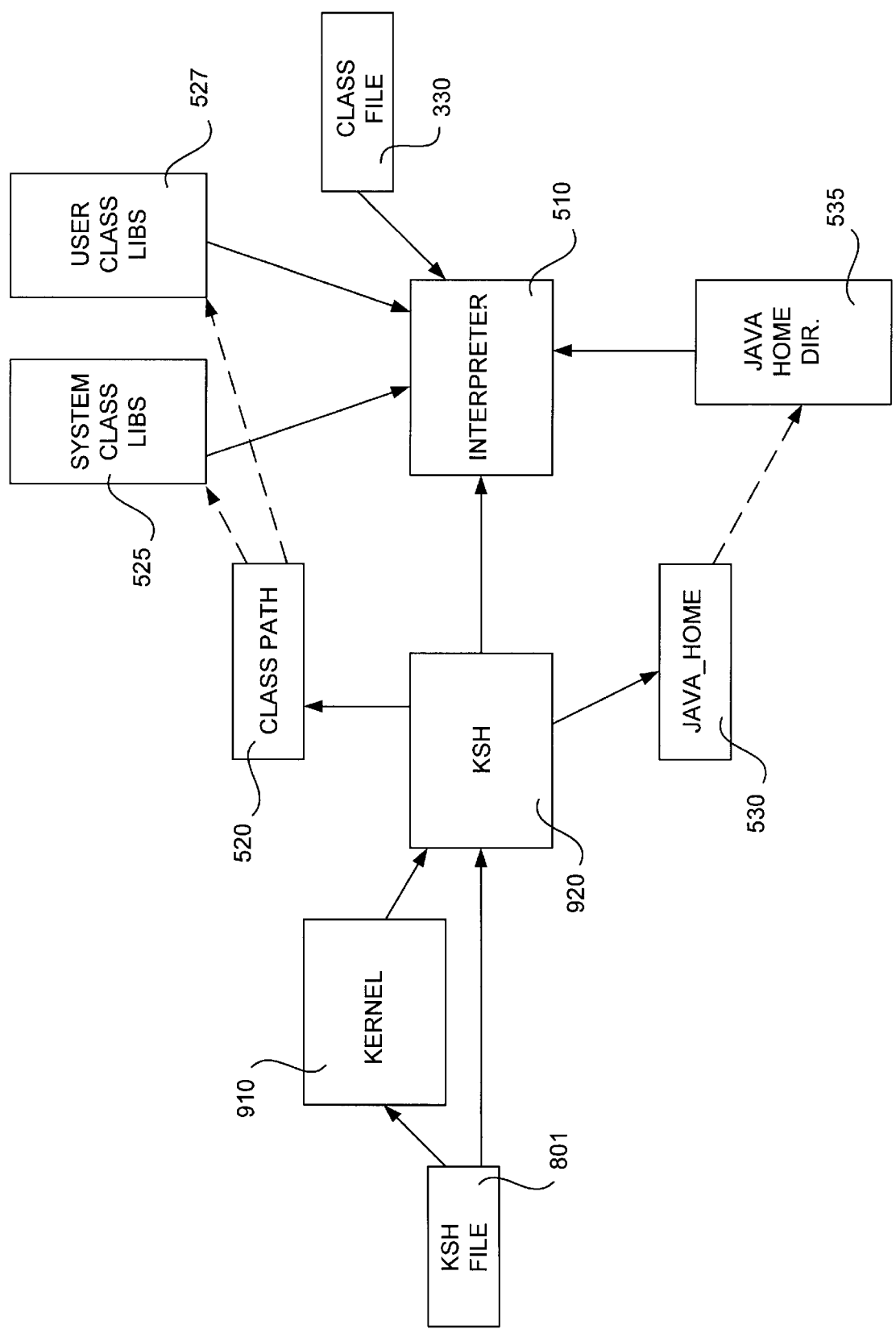
FIG. 9 depicts the execution of a compiled Java™ class through a script as depicted in FIG. 8.

FIG. 9 depicts the execution of a Java™ class using the method shown in FIGS. 7 and 8. The user types the name of Korn shell script file 801. This file is read by UNIX kernel 910, which sees the string #!/bin/ksh and invokes Korn shell 920, which reads and interprets the script file. Korn shell 920 sets the CLASSPATH environment variable 520 and JAVA__HOME environment variable 530 and invokes Java™ interpreter 510, specifying the name of class file 330. From this point forward, execution proceeds as described with reference to FIG. 5. That is, the Java™ interpreter 510 takes as input class file 330. The interpreter interrogates the environment variable 530 named "JAVA__HOME" and thereby determines the name of the home directory 535 for the Java™ run-time system. The Java™ interpreter also interrogates the "CLASSPATH" environment variable 520, thereby determining the names of various user class libraries 527 and system class libraries 525, which contain additional classes that may be invoked at run time.

Although the process of FIG. 7 produces a script file that may be used to allow the invocation of the Java™ class file, through the means of the script, one drawback to this approach is that the script file 801 and the executed class file 330 must be maintained within the same directory structure. This is not ordinarily a major burden in major systems, because such systems usually make substantial use of user class libraries 527, and the directory relationship of the executed class file 330 and the user class libraries 527 must be maintained in any event. However, the process of FIG. 7 introduces additional maintenance duties on small systems (such as the example "HelloWorldApp" application) where such file relationship maintenance is not ordinarily required. An additional drawback to this approach is that it requires interpretation, not only of the Java™ object code, but also of the shell script. This extra level of interpretation consumes additional system resources. To eliminate this maintenance and to reduce the resources needed to invoke the shell, it is desirable to provide a means by which an executable file such as shell script 801 may be created, but in which the resulting file contains the executable Java™ code, rather than invoking a separate file.

The ELF Format

Figure 11:
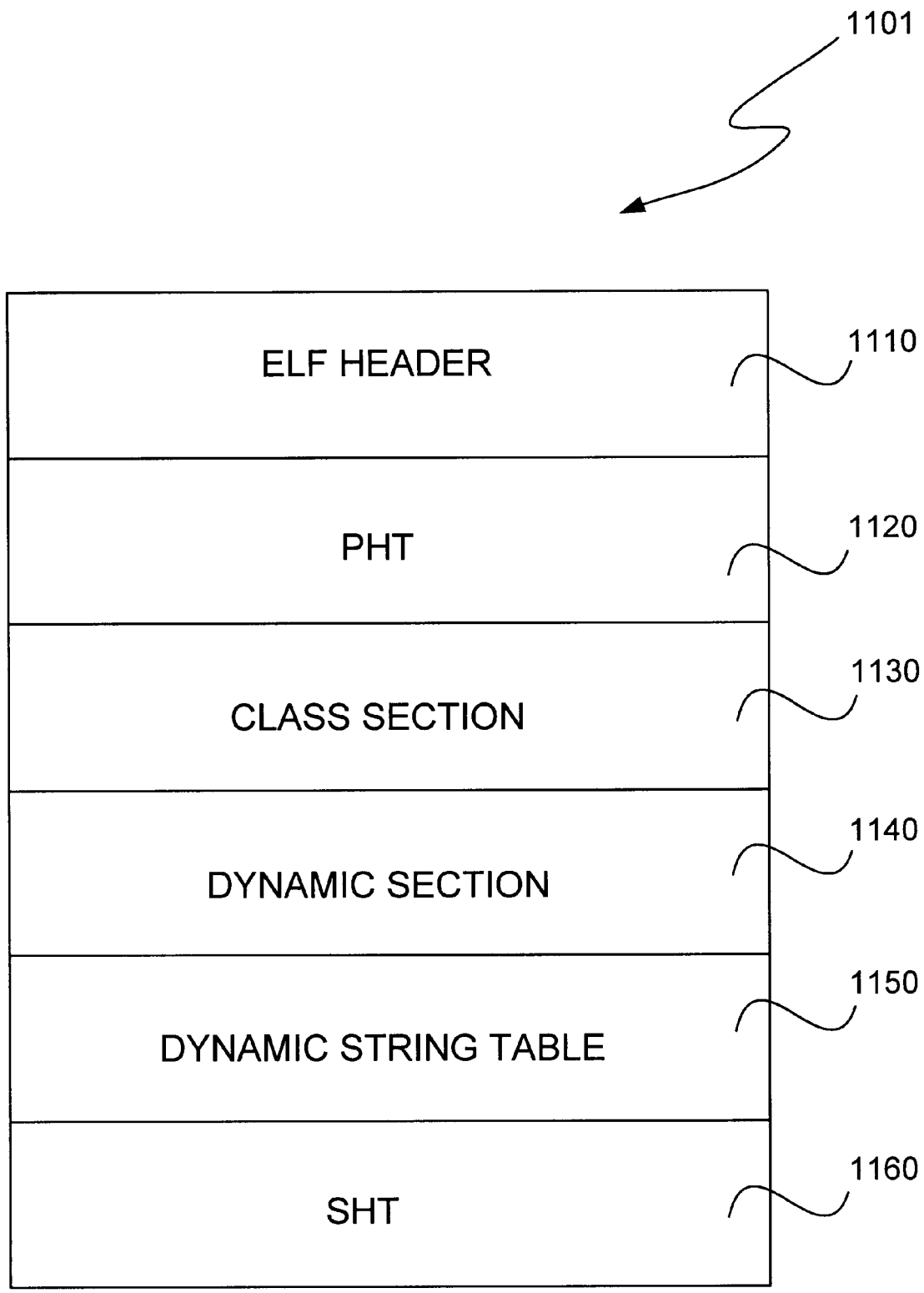
FIG. 11 depicts the format of a binary file in ELF format adapted to support an architecture-independent binary executable code.

FIG. 11 depicts the format of a binary file 1101 in ELF format adapted to support an architecture-independent binary executable code. To provide maximum portability, the file is formatted according to the ELF (Executable and Linking Format) format defined as the standard binary interface that is used by application programs on operating systems that comply with the UNIX System V Interface Definition. The ELF format is described in *System V Application Binary Interface, Third Edition* (1993) ("the ABI"), the disclosure of which is hereby incorporated by reference.

The format of sections of binary file 1101 is described here using a structure notation. Successive fields in the structure appear in the external representation without padding or alignment. Variable size arrays, often of variable sized elements are called tables and are commonplace in these structures. The type Elf32__Addr refers to an unsigned program address having a size of four bytes and aligned on a 4-byte boundary. The type Elf32__Half refers to an unsigned medium integer having a size of two bytes and aligned on a 2-byte boundary. The type Elf32__Off refers to an unsigned file offset having a size of four bytes and aligned on a 4-byte boundary. The type Elf32__Sword refers to a signed large integer having a size of four bytes and aligned on a 4-byte boundary. The type Elf32__Word refers to an signed large integer a size of two bytes and aligned on a 2-byte boundary. The type unsigned char refers to an unsigned small integer having a size of one byte and aligned on a 1-byte boundary.

The ELF file 1101 of the present invention comprises an ELF header 1110, Program Header Table (PHT) 1120, Class section 1130, Dynamic section 1140, Dynamic String Table 1150 and Section Header Table (SHT) 1160. Although FIG. 11 shows the components parts of binary file 1101 in a particular order, the actual file layout may differ. Apart from ELF header 1110, which has a fixed position at the start of the file, the various sections and segments other than the ELF header have no specified order.

ELF Header

ELF header 1110 resides at the beginning of the file 1101 and holds a roadmap describing the file's organization. ELF header 1110 has the following format.

```
#define EI_Nident 16
typedef struct {
    unsigned char  e_ident[EI_NIDENT];
    Elf32_Half     e_type;
    Elf32_Half     e_machine;
    Elf32_Word     e_version;
    Elf32_Addr     e_entry;
    Elf32_Off      e_phoff;
    Elf32_Off      e_shoff;
    Elf32_Word     e_flags;
    Elf32_Half     e_ehsize;
    Elf32_Half     e_phentsize;
    Elf32_Half     e_phnum;
    Elf32_Half     e_shentsize;
    Elf32_Half     e_shnum;
    Elf32_Half     e_shstrndx;
} Elf32_Ehdr;
```

The e_ident field comprises initial bytes (bytes 0–15) that mark the file as an object file and provide machine-independent data with which to decode and interpret the file's contents. Bytes 0–3 (denoted by EI_MAG0, EI_MAG1, EI_MAG2 and EI_MAG3) is a constant to validate the file. Byte 0 (EI_MAG0) contains a value 0x7F. Bytes 1–3 (EI_MAG 1, EI_MAG2 and EI_MAG3) contain the values 'E', 'L' and 'F', respectively. Byte 4 (EI_CLASS) identifies the type of architecture of the file. A value of 1 (ELFCLASS32) indicates 32-bit architecture, while a value of 2 (ELFCLASS64) indicates a 64-bit architecture. A value of zero (ELFCLASSNONE) indicates an invalid architecture type. In a typical embodiment of the present invention, EI_CLASS has a value ELFCLASS32.

Byte 5 (EI_DATA) specifies the data encoding of data in the file. A value of 1 (ELFDATA2LSB) indicates little-endian encoding; a value of 2 (ELFDATA2MSB) indicates big-endian encoding; a value of 0 indicates an invalid encoding. In the present invention, EI_DATA has a value ELFDATA2MSB. Byte 6 (EI_VERSION) specifies the ELF header version number of the version to which the header was built. The remainder of e_ident is not used.

The e_type field identifies the object file type. This field will be set to 2 (ET_EXEC) to indicate an executable file.

The e_machine field identifies the machine type (e.g., 1 for Sun™ Microsystems' SPARC™ architecture, 3 for Intel's 80386 architecture, 21 for IBM's RS6000 architecture, etc.). This field is set to an arbitrarily but predetermined assigned number indicating the type of machine whose architecture is compatible with the executable code contained in the file. At present, the values 22 through 65535 are unassigned, and one of these values (e.g., 22) will be assigned to represent the Java™ Virtual Machine hypothetical architecture.

The e_version field represents the object file version.

The e_entry field gives the virtual address to which the system first transfers control, thus starting the process. For the present invention, this member holds zero.

The e_phoff field holds the program header table's file offset in bytes.

The e_shoff field holds the section header table's file offset in bytes.

The e_flags field holds processor-specific flags associated with the file.

The e_ehsize field holds the ELF header's size in bytes.

The e_phentsize field holds the size in bytes of one entry in the file's program header table (PHT) 1120. All PHT entries are the same size.

The e_phnum field holds the number of entries in the program header table. Thus, the product of e_phentsize and e_phnum gives the table's size in bytes.

The e_shentsize field holds the size of section header in bytes. A section header is one entry in the section header table (SHT) 1160; all entries are the same size.

The e_shnum field holds the number of entries in the section header table 1160. Thus the product of e_shentsize and e_shnum gives the section header table's size in bytes.

The e_shstrndx field holds the section header table index of the entry associated with the section name string table 1150.

Program Header Table

Program Header Table (PHT) 1120 is an array of structures, each describing a segment or other information the system needs to prepare the program for execution. A file specifies its own program header size with the e_phentsize and e_phnum fields in ELF Header 1110.

PHT 1120 has the following format:

```
typedef struct {
    Elf32_Word  p_type;
    Elf32_Off   p_offset;
    Elf32_Addr  p_vaddr;
    Elf32_Addr  p_paddr;
    Elf32_Word  p_filesz;
    Elf32_Word  p_memsz;
    Elf32_Word  p_flags;
    Elf32_Word  p_align;
}Elf32_Phdr;
```

The p_type field tells what kind of segment this array element describes or how to interpret the array element's information. As currently described in the ABI, the values 0 through 6 are valid and defined values for p_type. Values 7 through 0x6FFFFFFF are not in use, and values in the range 0x70000000 (PT_LOPROC) through 0x7FFFFFFF (PT_HIPROC) are reserved for processor-specific semantics.

For the present invention, at least two values are used. The first value used is 2 (PT_DYNAMIC). PT_DYNAMIC indicates a dynamic section 1140 containing dynamic linking information. The second value used is a predetermined value not yet assigned (i.e., in the range 7 through 0x6FFFFFFF) (PT_CLASS) to indicate a class section 1130 of loadable code, which will contain the equivalent of the Java™ class file.

The p_offset field gives the offset from the beginning of the file at which the first byte of the segment resides.

The p_vaddr field gives the virtual address at which the first byte of the segment resides in memory. The p_paddr field is not used in the present invention.

The p_filesz field gives the number of bytes in the file image of the segment; it may be zero.

The p_memsz field gives the number of bytes in the memory image of the segment; it may be zero.

The p_flags holds permission flags indicating whether the segment has execute, write or read permissions.

The p_align field is not used in the present invention.

Class Section

The Class section 1130 contains the same binary image as that contained in class file 330. This data will be read from binary file 1101 during execution and provided to the Java™ interpreter 510. Class section 1130 is indicated by flag PT_CLASS set in the corresponding entry in PHT 1120.

Dynamic Section

The Dynamic section 1140 (named ".dynamic" in the ELF format) is an array of structures, each providing pointers and other information identifying system class libraries 525 and user class libraries 527. Dynamic section 1140 is indicated by an entry of type SHT_DYNAMIC in Section Header Table 1160 and and by an entry of type PT_DYNAMIC in Program Header Table 1120.

Dynamic Section 1140 has the following structure:

```
typedef struct {
    ELF32_Sword    d_tag;
    union{
        ELF32_Word    d_val;
        Elf32_Addr    d_ptr;
    } d_un;
} Elf32_Dyn;
```

The union d_un field is interpreted as either a word d_val or an address d_ptr, or is ignored, depending on the value of d_tag.

The ELF file structure supports a wide variety of values for d_tag. As currently described in the ABI, the values 0 through 23 are valid and defined values for d_tag. Values 24 through 0x6FFFFFFF are not in use, and values in the range 0x70000000 (DT_LOPROC) through 0x7FFFFFFF (DT_HIPROC) are reserved for processor-specific semantics. The present invention uses two existing values for d_tag, and three new values. The two existing values are DT_NULL and DT_STRTAB. The three new values are DT_JAVA_CLASSNAME, DT_JAVA_NEEDED_CLASSDIR, and DT_JAVA_NEEDED_LIBDIR.

If d_tag has a value of 0 (DT_NULL), then that entry marks the end of the array. If d_tag has a value of 5 (DT_STRTAB), then d_un is interpreted as an address d_ptr, and holds the address of the string table 1150.

The values DT_JAVA_CLASSNAME, DT_JAVA_NEEDED_CLASSDIR, and DT_JAVA_NEEDED_LIBDIR are predetermined values not yet assigned by the ABI (i.e., three values in the range 24 through 0x6FFFFFFF). For purposes of example only, it may be assumed that the symbolic values DT_JAVA_CLASSNAME, DT_JAVA_NEEDED_CLASSDIR, and DT_JAVA_NEEDED_LIBDIR correspond, respectively, to the numeric values 24, 25 and 26. Obviously, any three unassigned values could be used in lieu of 24, 25 and 26.

If d_tag has the value DT_JAVA_CLASSNAME (e.g., 24), d_un is interpreted as a word d_val, and holds an offset into String Table 1150 of a null-terminated string. The null-terminated string provides the name of the class represented by the contents of the Class Section 1130. The offset is an index into the table recorded in the DT_STRTAB entry.

If d_tag has the value DT_JAVA_NEEDED_CLASSDIR (e.g., 25), d_un is interpreted as a word d_val, and holds an offset into String Table 1150 of a null-terminated string. The null-terminated string provides the name of a directory to be searched as a user class library 527 that contains additional classes that may be invoked at run time. The offset is an index into the table recorded in the DT_STRTAB entry. The dynamic array may contain multiple entries with this type. These entries' relative order is significant, though their relation to entries of other types is not.

If d_tag has the value DT_JAVA_NEEDED_LIBDIR (e.g., 26), d_un is interpreted as a word d_val, and holds an offset into String Table 1150 of a null-terminated string. The null-terminated string provides the name of a directory to be searched as a system class library 525 that contains additional classes that may be invoked at run time. The offset is an index into the table recorded in the DT_STRTAB entry. The dynamic array may contain multiple entries with this type. These entries' relative order is significant, though their relation to entries of other types is not.

Dynamic String Table

Dynamic String Table 1150 (named ".dynstr" in the ELF format) holds null-terminated character sequences, commonly called strings. The object file uses these strings to represent symbol and section names. One references a string as an index into the string table section. The first byte, which is index zero, is defined to hold a null character. Likewise, a string table's last byte is defined to hold a null character, ensuring null termination for all strings. A string whose index is zero specifies either no name or a null name, depending on the context. An empty string table section is permitted; its section header's sh_size member would contain zero. Non-zero indexes are invalid for an empty string table. A section header's sh_name member holds an index into the section header string table section, as designated by the e_shstrndx member of the ELF header.

Section Header Table

Section Header Table 1160 is a sequence of Elf32_Shdr structures in the following format:

```
typedef struct{
    Elf32_Word    sh_name;
    Elf32_Word    sh_type;
    Elf32_Word    sh_flags;
    Elf32_Addr    sh_addr;
    Elf32_Off     sh_offset;
    Elf32_Word    sh_size;
    Elf32_Word    sh_link;
    Elf32_Word    sh_info;
    Elf32_Word    sh_addralign;
    Elf32_Word    sh_entsize;
} Elf32_Shdr;
```

The sh_name field specifies the name of the section. Its value is an index into the section header string table section, giving the location of a null-terminated string.

The sh_type field categorizes the section's contents and semantics. The present invention uses two values for sh_type: SHT_STRTAB and SHT_DYNAMIC. If sh_type has a value of 3 (SHT_STRTAB), then the SHT entry describes a section that holds the Dynamic String Table 1150. If sh_type has a value of 6 (SHT_DYNAMIC), then the SHT entry describes a Class Section 1120. In addition, a value of 0 (SHT_NULL) indicates an inactive entry that does not correspond to any section.

The sh_flags field supplies 1-bit flags that describe miscellaneous attributes.

The sh_addr field is not used in the present invention.

The sh_offset field value gives the byte offset from the beginning of the file to the first byte in the section.

The sh_size field gives the section's size in bytes.

The sh_link and sh_info fields are not used in the present invention.

The sh_addralign field is used to indicate alignment requirements for the section.

The sh_entsize field is used for sections that hold a table of fixed-size entries, such as a symbol table. For such a section, this field gives the size in bytes of each entry. The field contains 0 if the section does not hold a table of fixed-size entries. This field is not used in the present invention.

Figure 10:
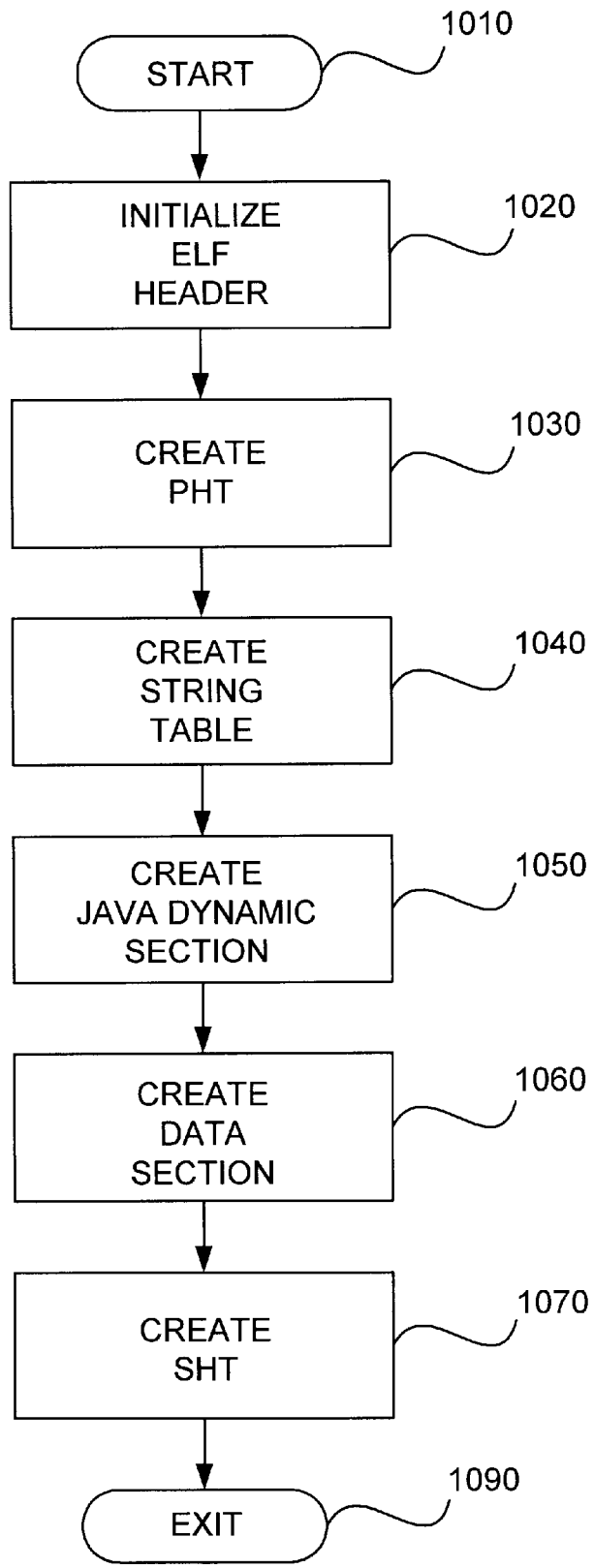
FIG. 10 depicts a procedure for creating a single executable file containing both Java™ class file contents and dynamic library location information.

FIG. 10 depicts a procedure for creating a single executable file containing both Java™ class file contents and dynamic library location information, thereby permitting direct Java™ class execution without concern for file relationship correlation. The procedure of FIG. 10 is invoked in the same fashion and syntax as the procedure of FIG. 7, e.g.:

javald -C /opt/acme/lib-C lib -o foo progname

Execution begins in step 1010. In step 1020, the program initializes an ELF header 1110. In step 1030, the program initializes PHT 1120. In step 1040, the program creates Dynamic String Table 1150. This table is filled with the required string constants identifying the system class libraries 525 and user class libraries 527. In step 1050 the program creates Dynamic Section 1140 and fills it with pointers to the string table entries in Dynamic String Table 1150. In step 1060, the program reads in class file 330 and copies it into Class Section 1130. In step 1070, the program creates Section Header Table 1160 and initializes section header table entries describing Dynamic Section 1140 and Class Section 1130. Execution terminates in step 1090. At this point, a binary file in ELF format has been created that contains both the contents of the class file 330 and the data necessary to specify class libraries 525 and 527.

Figure 12:
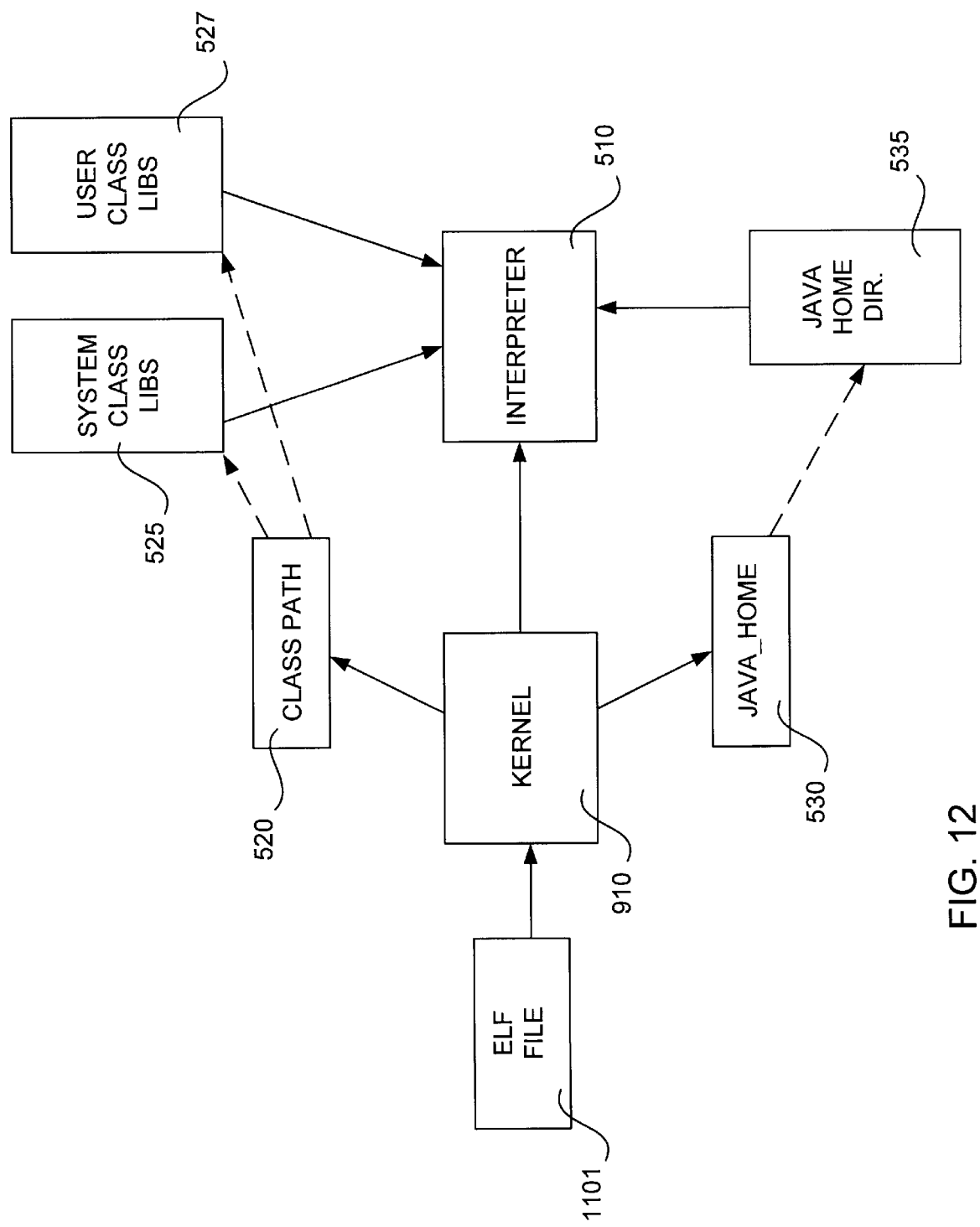
FIG. 12 depicts the execution of the binary ELF file of FIG. 11.

FIG. 12 depicts the execution of the binary ELF file of FIG. 11. The user types the name of binary file 1101. This file is read by UNIX kernel 910, which examines and interprets the contents of the file as described with respect to FIG. 11. Kernel 910 sets CLASSPATH 520 and JAVA_HOME 530 according to the values stored in string table 1150 and pointed to by Dynamic Section 1140. Kernel 910 then passes the contents of Data Section 1130 to Java™ interpreter 510. The contents may be passed by any of a number of methods, including, for example through a UNIX pipe. Alternative methods include passing to the Java™ interpreter a file descriptor pointing to the offset of Class Section 1130 within binary file 1101, or to map Class Section 1130 into memory and pass the base address of the mapped memory location to the Java™ interpreter. Java™ interpreter 510 does not reference input class file 330 and instead obtains the Java™ class information from ELF file 1101 as supplied by kernel 910. The interpreter interrogates the environment variable 530 named "JAVA_HOME" and thereby determines the name of the home directory 535 for the Java™ run-time system. Java™ interpreter also interrogates the "CLASSPATH" environment variable 520, thereby determining the names of various user class libraries 527 and system class libraries 525, which contain additional classes that may be invoked at run time. Alternatively, if the Java™ interpreter is invoked by passing to it the file descriptor or the base address of a mapped memory location, the Java™ interpreter may obtain the dependency information directly from the ELF file.

This third approach is particularly attractive in that it permits dynamic resolution of the CLASSNAME without imposing the duty of coordinating locations of the Java™ class file 330 and a script file. There is no script file, and in fact, Java™ class file may be deleted following the javald operation, because the class file is used only in the javald process and never referenced during execution.

While various embodiments of a preferred embodiment have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method of executing an architecture-independent binary program on a computer, said method comprising the steps of:
    (a) reading an object file containing object code;
    (b) selecting a predetermined code portion of the object file;
    (c) comparing the contents of a predetermined field within the code portion to a predetermined value to determine whether the object code is architecture-independent object code that requires interpretation; and
    (d) if the object code requires interpretation, invoking an interpreter to interpret the object code.

2. The method of claim 1, said method further comprising the steps of:
    e) extracting dynamic dependency information from the object file; and
    f) providing the dynamic dependency information to the interpreter.

3. The method of claim 2 in which the object file comprises a data section and a dynamic section, said dynamic section identifying at least one library configured to provide additional object files to be executed by the interpreter.

4. The method of claim 3 in which the object file further comprises a string table, said string table including one or more strings, each of said strings identifying a library.

5. The method of claim 1 in which the object file is structured according to an industry-standard format.

6. The method of claim 3 in which the object file is structured according to the ELF file format.

7. The method of claim 1 in which the object file comprises a Java class file.

8. An apparatus for executing an architecture-independent binary program on a computer, comprising:
    a) at least one processor;
    b) a storage with a plurality of code segments stored thereon which are utilized by the processor to perform various functions, comprising:
        i) a first code segment which reads an object file containing object code;
        ii) a second code segment which selects a predetermined code portion of the object file;
        iii) a third code segment which compares the contents of a predetermined field within the code portion to a predetermined value and determines whether the object code is architecture-independent object code that requires interpretation; and
        iv) a fourth code segment which interprets the object code if the object code requires interpretation.

9. The apparatus of claim 8, said apparatus further comprising:
    v) a fifth code segment utilized by the processor to extract dynamic dependency information from the object file; and
    vi) a sixth code segment utilized by the processor to provide the dynamic dependency information to the interpreter.

10. The apparatus of claim 9 wherein the object file comprises a data section and a dynamic section, said dynamic section identifying at least one library configured to provide additional object files to be executed by the interpreter.

11. The apparatus of claim 10 in which the object file further comprises a string table, said string table including one or more strings, each of said strings identifying a library.

12. The apparatus of claim 8 wherein the object file conforms to an industry-standard format.

13. The apparatus of claim 12 wherein the object file conforms to the ELF file format.

14. The apparatus of claim 8 in which the object file comprises a Java class file.

15. A computer program product comprising a computer usable medium having computer readable code embodied therein for causing execution of an architecture-independent binary program on a computer, said computer program product comprising:

a) first software that reads an object file containing object code;

b) second software that selects a predetermined code portion of the object file;

c) third software that compares the contents of a predetermined field within the code portion to a predetermined value to determine whether the object code is architecture-independent object code that requires interpretation; and d) fourth software that invokes an interpreter to interpret the object code if the object code requires interpretation.

16. The computer program product of claim 15, said computer program product further comprising:

e) fifth software that extracts dynamic dependency information from the object file; and f) sixth software that provides the dynamic dependency information to the interpreter.

17. The computer program product of claim 16 wherein the object file comprises a data section and a dynamic section, said dynamic section identifying at least one library configured to provide additional object files to be executed by the interpreter.

18. The computer program product of claim 17 wherein the object file further comprises a string table, said string table including one or more strings, each of said strings identifying a library.

19. The computer program product of claim 15 wherein the object file conforms to an industry-standard format.

20. The computer program product of claim 19 wherein the object file conforms to the ELF file format.

21. The computer program product of claim 15 wherein the object file comprises a Java class file.

* * * * *